(12) United States Patent
Horst et al.

(10) Patent No.: US 7,122,933 B2
(45) Date of Patent: Oct. 17, 2006

(54) REDUCED COIL SEGMENTED STATOR

(75) Inventors: Gary E Horst, Manchester, MO (US); Keith I Hoemann, Fenton, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 10/850,594

(22) Filed: May 19, 2004

(65) Prior Publication Data

US 2005/0258706 A1    Nov. 24, 2005

(51) Int. Cl.
*H02K 1/00* (2006.01)
*H02K 3/00* (2006.01)

(52) U.S. Cl. ............................ 310/218; 310/179
(58) Field of Classification Search ............... 310/216, 310/217, 179, 180, 185, 195, 198
See application file for complete search history.

(56) References Cited

U.S. PATENT DOCUMENTS

| | | | | |
|---|---|---|---|---|
| 4,475,051 A | * | 10/1984 | Chai et al. | 310/49 R |
| 5,164,622 A | * | 11/1992 | Kordik | 310/67 R |
| 5,418,416 A | * | 5/1995 | Muller | 310/186 |
| 5,583,387 A | * | 12/1996 | Takeuchi et al. | 310/217 |
| 5,654,601 A | | 8/1997 | Fulton | |
| 5,675,196 A | * | 10/1997 | Huang et al. | 310/67 R |
| 5,729,072 A | * | 3/1998 | Hirano et al. | 310/258 |
| 5,786,651 A | * | 7/1998 | Suzuki | 310/259 |
| 5,874,795 A | * | 2/1999 | Sakamoto | 310/156.12 |
| 5,909,072 A | * | 6/1999 | Muller | 310/68 B |
| 6,133,663 A | | 10/2000 | Hoemann | |
| 6,369,687 B1 | * | 4/2002 | Akita et al. | 336/234 |
| 2002/0175587 A1 | | 11/2002 | Vollmer | |
| 2003/0214197 A1 | | 11/2003 | De Luca et al. | |
| 2004/0201303 A1 | * | 10/2004 | Zhang et al. | 310/216 |

FOREIGN PATENT DOCUMENTS

| | | |
|---|---|---|
| EP | 0 629 034 A | 12/1994 |
| EP | 0 823 771 A | 2/1998 |
| GB | 2 149 226 A | 6/1985 |
| GB | 2 224 399 A | 5/1990 |
| JP | 10 1742319 A | 9/1998 |
| WO | WO 95/12912 A | 5/1995 |
| WO | WO 2005/117233 A1 | 12/2005 |

OTHER PUBLICATIONS

International Search Report for International Application No. PCT/US2005/017076 dated Aug. 19, 2005; 3 pages.
T. Kenjo and S. Nagamori, "Permanent-Magnet and Brushless DC Motors", Clarendon Press, Oxford 1985, pp. 2-4.

* cited by examiner

*Primary Examiner*—Tran Nguyen
(74) *Attorney, Agent, or Firm*—Harness, Dickey & Pierce, P.L.C.

(57) ABSTRACT

A brushless permanent magnet (BPM) electric machine including a segmented stator having interconnected stator segment assemblies defining M stator teeth. Each of said M stator teeth having substantially the same axially facing size and shape. N coil windings are individually wound about the stator teeth. N<M.

17 Claims, 3 Drawing Sheets

REDUCED COIL SEGMENTED STATOR

FIELD OF THE INVENTION

The present invention relates to electric machines, and more particularly to a reduced coil segmented stator for an electric machine.

BACKGROUND OF THE INVENTION

Electric machines, such as motors and generators, typically include a stator that is mounted inside a housing and a rotor that is supported for rotation relative to the stator. Electric machines are often integrated into devices such as appliances. The size, capacity and/or cost of the device incorporating the electric machine may be an important factor in the purchasing decision. These factors also have a significant impact on the overall size, capacity and cost, respectively, of the device.

SUMMARY OF THE INVENTION

Accordingly, the present invention provides a brushless permanent magnet (BPM) electric machine including a segmented stator having interconnected stator segment assemblies defining M stator teeth. Each of said M stator teeth have substantially the same axially facing shape and size. N coil windings are individually wound about the stator teeth, where N<M.

In other features, the first plurality includes M stator teeth and the second plurality includes N=M/2 coil windings. M can be equal to 12.

In still another feature, the second plurality of coil windings are electrically interconnected to define three phases.

In yet another feature, the BPM electric machine further includes a rotor having a plurality of permanent magnets disposed thereabout.

In yet another feature, the N coil windings are wound about every other one of the M stator teeth.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following detailed description provides preferred exemplary embodiments only and is not intended to limit the scope, applicability or configuration of the present invention. Rather, the detailed description of the preferred exemplary embodiments will provide those skilled in the art with an enabling description for implementing the preferred exemplary embodiments of the present invention. It will be understood that various changes may be made in the function and arrangement of the elements without departing from the spirit and scope of the invention as set forth in the appended claims.

Figure 1:
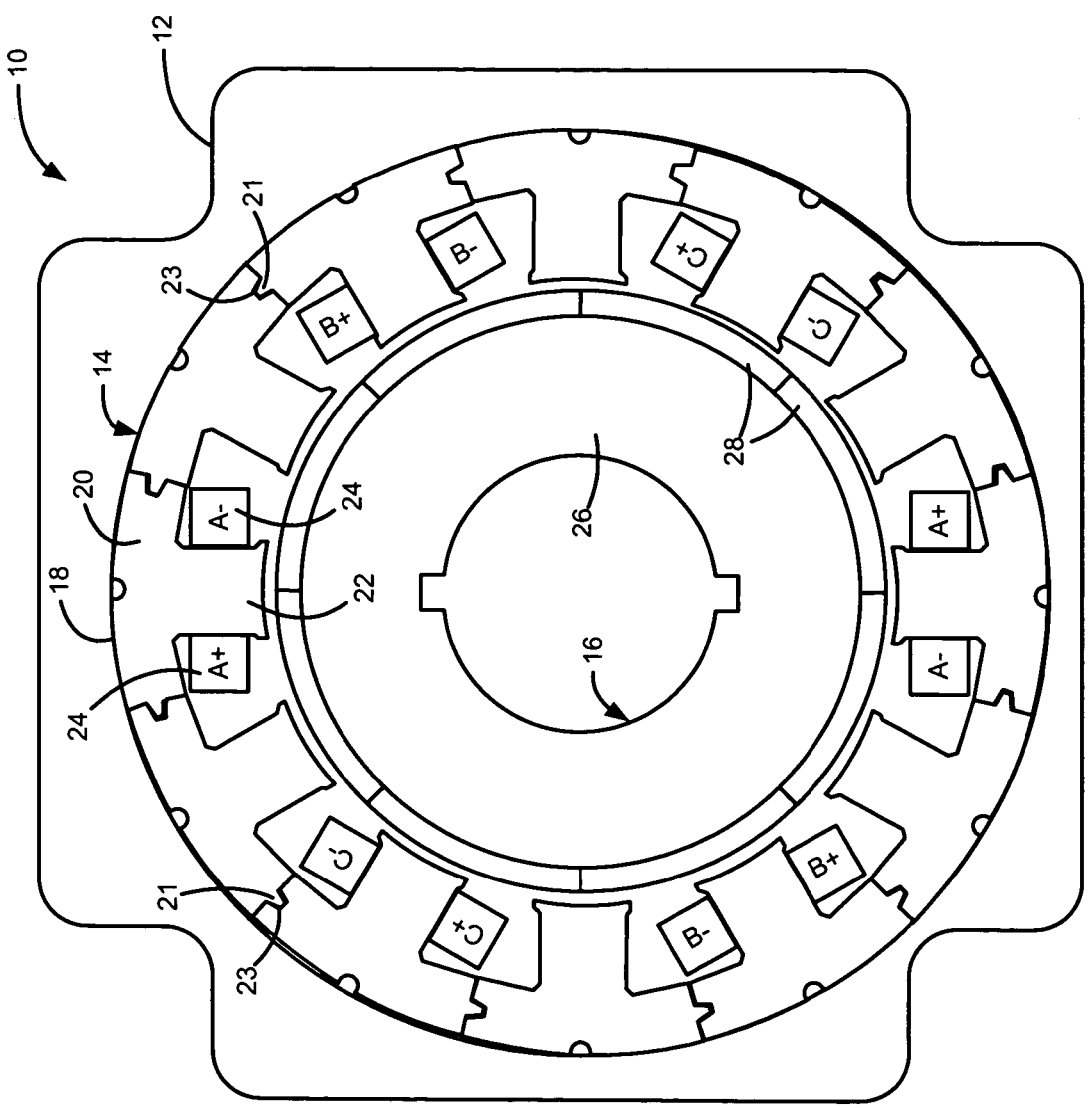
FIG. 1 is a schematic illustration of an exemplary brushless permanent magnet (BPM) electric machine according to the present invention.

Referring now to FIG. 1, an electric machine 10 is shown and includes a housing 12, a segmented stator 14 mounted in the housing 12, and a rotor assembly 16 supported for rotation relative to the segmented stator 14. The electric machine 10 is a brushless permanent magnet (BPM) electric machine. While the present invention is being described in conjunction with BPM electric machines, skilled artisans will appreciate that other types of electric machines may be employed.

The segmented stator 14 includes a plurality of stator segment assemblies 18 that can be individually assembled and subsequently combined to define the segmented stator 14. As will be detailed, each stator segment assembly 18 includes a stator segment core 20 that forms a stator tooth 22, a key 21 and a slot 23. The stator teeth 22 of all of the stator segment assemblies 18 have substantially identical size and profiles. As a result, a single type of stator segment assembly 18 is used, which reduces cost.

The keys 21 and slots 23 of the individual stator segment cores 20 interconnect. As can be appreciated, the keys 21 and slots 23 may include mating profiles having other shapes. Alternatively, the keys 21 and slots 23 may be omitted. Selective stator segment assemblies include coil windings 24 that are wound around the stator tooth 22, in accordance with the present invention. More particularly, every other segmented stator assembly 18 includes a coil winding 24. The number of coil windings N is defined according to the following relationship:

$N=M/2$, wherein $M=\#$ of stator teeth

The coil windings 24 are wound about the selective stator teeth 22 to define three phases A, B and C as single-layer or double-layer concentrated windings. That is to say, a single phase is wound about a single stator tooth 22 and is not distributed across multiple stator teeth, as would occur in a distributed winding scheme. The exemplary segmented stator 14 includes twelve (12) stator segment assemblies 18 and six (6) coil windings 24. The assembled segmented stator 14 defines twelve (12) slots between the stator teeth 22.

The rotor assembly 16 includes a rotor core 26 having a plurality of permanent magnets 28 distributed therearound. The exemplary rotor assembly 16 includes eight (8) permanent magnets defining eight (8) poles. Although the exemplary electric machine 10 is a 3-phase, 12-slot, 8-pole BPM electric machine having 6-coils, it is anticipated that the reduced coil windings of the present invention can be implemented in other segmented stator electric machines including, but not limited to, a 3-phase, 18-slot, 12-pole BPM electric machine having 9 coils.

When assembling the electric motor 10, the individual stator segment assemblies 18 are initially assembled. As discussed above, only select stator segment assemblies 18 are wound with the coil windings 24. The non-wound and pre-wound stator segment assemblies 18 are assembled together to form the segmented stator 14. The coil windings 24 of the pre-wound stator segment assemblies are connected to define a circuit in a manner known in the art. More particularly, leads (not shown) of the individual coil windings 24 are electrically connected such that the phases A, B and C induce alternating eddy currents when an electrical current is applied. The eddy currents induce rotation of the rotor.

Segmented stator assemblies provide specific advantages over other stator assemblies known in the art, such as single-piece stator assemblies. Segmented stator assemblies provide an improved power density over a single-piece stator assembly having an equivalent number of coil windings. More particularly, because the coil windings are pre-wound prior to assembling the stator segment assemblies, the slot fill between the stator teeth 22 can be increased. This is because the winding mechanism is not obstructed by adjacent stator teeth 22. As a result, a segmented stator assembly includes a higher power density, which enables a higher torque output than a similarly sized, single-piece stator electric motor having an equivalent number of windings. Accordingly, the reduced coil segmented stator assembly 14 of the present invention provides a higher power density than a reduced coil single-piece stator assembly.

The reduced coil winding construction achieves significant gains in the manufacturing process. More particularly, less material (e.g., coil wire) is required to manufacture the electric machine 10. In this manner, material cost is reduced. Further, because there are fewer coils than a conventional electric machine 10, there are fewer coil leads to connect during the manufacturing process. In this manner, the manufacturing process is simplified and manufacturing costs are reduced. Additionally, because the coil windings are completely separated, the potential for shorting is reduced and phase insulation is generally not required. Because the segmented stator assembly 14 provides a higher power density per coil than an equivalently sized single-piece stator electric machine, the reduction in power density that results from the reduced number of winding coils 24 is not as severe as would be in a reduced coil single-piece stator electric machine.

Figure 3:
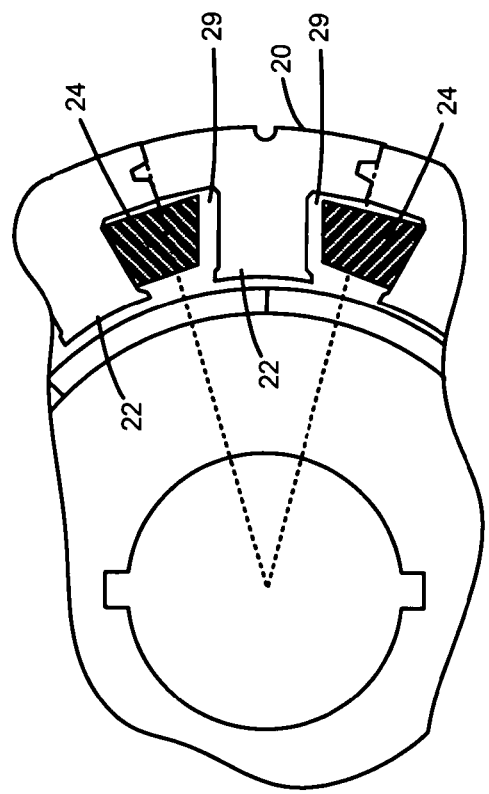
FIG. 3 is a more detailed view of a portion of FIG. 1 illustrating an alternative coil winding cross-section.
Figure 2:
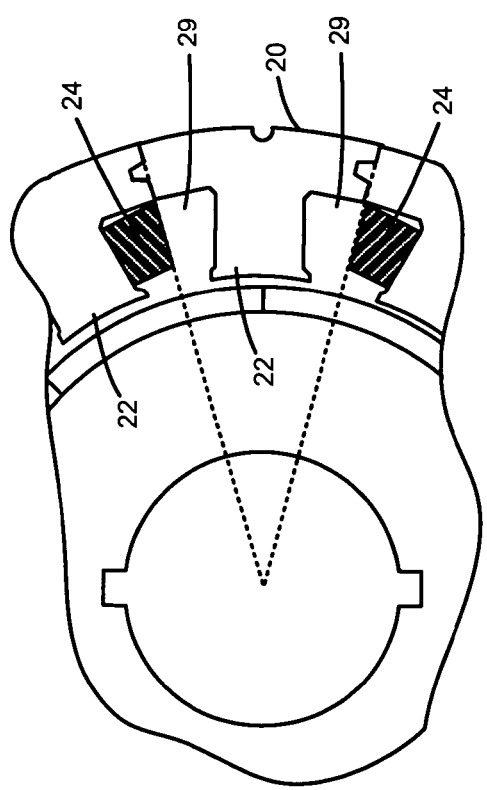
FIG. 2 is a more detailed view of a portion of FIG. 1 illustrating a coil winding cross-section.

Referring now to FIGS. 2 and 3, because N=M/2, there is more slot space 29 available between the stator teeth 22. As a result, each coil winding 24 can include more turns than would be possible in an equivalently sized single-piece stator electric machine having a full-winding construction (i.e., N=M). More specifically, the dashed lines indicate the mid-point of the slot spaces 29. Traditionally, coil windings were limited to a cross-section that extended at or near the mid-point of the slot spaces 29 due to adjacent coil windings (see FIG. 2). The reduced coil winding construction of the present invention enables the coil windings 24 to extend past the mid-point of the slot spaces 29 because there is no adjacent coil winding.

As an example, in a full-winding construction (i.e., N=M) electric machine, each coil winding may be limited to 100 turns because of the limited slot space between adjacent coil windings. In the electric machine 10, the coil windings 24 could achieve greater than 100 turns each (e.g., 200 turns). In this manner, the power density of the reduced coil winding electric machine 10 can be improved. It is also anticipated that the cross-section of coil windings 24 can vary to achieve the desired number of turns. Square, rectangular and trapezoidal-shaped cross-sections are exemplary cross-sections that can be implemented. Because the coil windings 24 can be pre-wound on the stator segment assemblies 18, the cross-section can be easily shaped to accommodate the desired number of windings.

Figure 4:
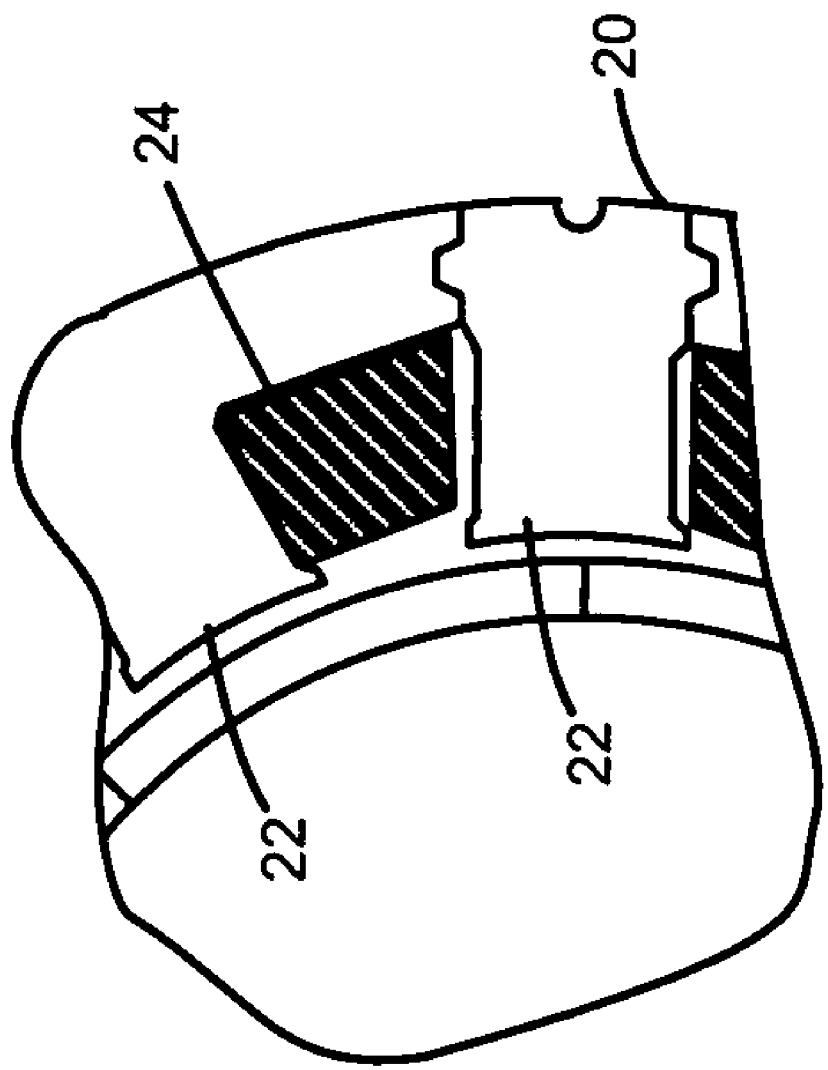
FIG. 4 is a more detail view of a portion of FIG. 1 illustrating an alternative stator segment core.

Referring now to FIG. 4, an alternative stator segment core 20' is illustrated and includes a straight back surface 40 that extends perpendicular to the adjacent stator tooth 22. The coil windings 24 run adjacent to the back surface 40. In this manner, the slot space 29 is more effectively used.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A segmented stator of an electric machine, comprising:
   M stator segment assemblies defining M stator teeth, each of said M stator teeth having substantially the same axially facing size and shape; and
   N coil windings individually wound about said stator teeth, wherein N<M and a cross-section of said coil windings is greater than 50% of a slot space between adjacent stator teeth.

2. The segmented stator of claim 1 wherein N=M/2.

3. The segmented stator of claim 2 wherein M=12.

4. The segmented stator of claim 1 wherein said N coil windings are electrically interconnected to define three phases.

5. The segmented stator of claim 1 wherein said N coil windings are wound about every other one of said M stator teeth.

6. The segmented stator of claim 1 wherein said segment assemblies each include a back surface that is perpendicular to a corresponding stator tooth, wherein said coil windings run parallel to said back surface.

7. A brushless permanent magnet (BPM) electric machine, comprising:
   a segmented stator including interconnected stator segment assemblies defining M stator teeth, each of said M stator teeth having substantially the same axially facing size and shape; and
   N coil windings individually wound about said stator teeth, wherein N<M and a cross-section of said coil windings is greater than 50% of a slot space between adjacent stator teeth.

8. The BPM electric machine of claim 7 wherein N=M/2.

9. The BPM electric machine of claim 8 wherein M=12.

10. The BPM electric machine of claim 7 wherein said N coil windings are wound about every other one of said M stator teeth.

11. The BPM electric machine of claim 7 wherein said second plurality of coil windings are electrically interconnected to define three phases.

12. The BPM electric machine of claim 7 further comprising a rotor having a plurality of permanent magnets disposed thereabout.

13. The BPM electric machine of claim 7 wherein said segment assemblies each include a back surface that is perpendicular to a corresponding stator tooth, wherein said coil windings run parallel to said back surface.

14. A segmented stator of an electric machine, comprising:
   stator segment assemblies defining a plurality of stator teeth, each of said plurality of stator teeth having substantially the same axially facing size and shape; and
   a plurality of coil windings individually wound about said stator teeth, wherein said plurality of coil windings is less than said plurality of stator teeth and a cross-section of said coil windings is greater than 50% of a slot space between adjacent stator teeth.

15. The segmented stator of claim 14 wherein said plurality of stator teeth includes M number of stator teeth and said plurality of coil windings includes M/2 number of coil windings.

16. The segmented stator of claim 15 wherein M=12.

17. The segmented stator of claim 14 wherein said plurality of coil windings are electrically interconnected to define three phases.

* * * * *